(12) United States Patent
Lin et al.

(10) Patent No.: US 7,675,482 B2
(45) Date of Patent: Mar. 9, 2010

(54) APPARATUS AND METHOD FOR DRIVING AN INTERLACED PLASMA DISPLAY PANEL

(75) Inventors: Chun-Hsu Lin, Taipei Hsien (TW); Chun-Lun Pan, Tainan (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 1139 days.

(21) Appl. No.: 11/163,719

(22) Filed: Oct. 28, 2005

(65) Prior Publication Data

US 2007/0052620 A1  Mar. 8, 2007

(30) Foreign Application Priority Data

Aug. 23, 2005  (TW) ............... 94128701 A

(51) Int. Cl.
 *G09G 3/28*  (2006.01)
(52) U.S. Cl. .................. 345/60; 345/61; 315/169.4
(58) Field of Classification Search ......... 345/204–215, 345/690–699, 60–72, 87–111; 315/169.1–169.4; 348/446–449, 550, 671, 792–793
See application file for complete search history.

(56) References Cited

U.S. PATENT DOCUMENTS

| | | | |
|---|---|---|---|
| 5,051,826 A | | 9/1991 | Ishii et al. |
| 6,169,527 B1 * | | 1/2001 | Kanazawa et al. ............ 345/60 |
| 6,448,947 B1 * | | 9/2002 | Nagai .......................... 345/60 |
| 6,496,164 B1 * | | 12/2002 | Kuwahara et al. ............ 345/60 |
| 2003/0076284 A1 * | | 4/2003 | Onozawa et al. ............. 345/60 |
| 2004/0263538 A1 * | | 12/2004 | Ohta et al. ................. 345/690 |
| 2005/0185092 A1 | | 8/2005 | Tanaka |

FOREIGN PATENT DOCUMENTS

| | | |
|---|---|---|
| JP | 10-241572 | 9/1998 |
| JP | 2000-122600 | 4/2000 |
| JP | 2005151135 | 6/2005 |
| JP | 2005-333529 | 12/2005 |

OTHER PUBLICATIONS

"Office Action of Japan counterpart application", issued on Sep. 25, 2009, p. 1-p. 3.

* cited by examiner

*Primary Examiner*—Chanh Nguyen
*Assistant Examiner*—Long Pham
(74) *Attorney, Agent, or Firm*—Jianq Chyun IP Office

(57) ABSTRACT

An apparatus for driving an interlaced plasma display panel (PDP), including a delay device, an image upper and lower edge detection device, an image border processing device, an image processing and analog control loop. The delay device receives an image signal, delays the image signal for two fields and outputs the delayed image signal. The image upper and lower edge detection device receives and analyzes the image signal, outputs the image upper and lower edge positions, saves and provides the odd field upper and lower edge data of the image signal. The image border processing device outputs the image signal after border processing according to the delayed image signal, the image upper and lower edge positions, the odd field upper and lower data. The image processing and analog control loop outputs a driving signal according to the image signal after border processing and the image upper and lower edge positions.

18 Claims, 8 Drawing Sheets

APPARATUS AND METHOD FOR DRIVING AN INTERLACED PLASMA DISPLAY PANEL

CROSS-REFERENCE TO RELATED APPLICATION

This application claims the priority benefit of Taiwan application serial no. 94128701, filed on Aug. 23, 2005. All disclosure of the Taiwan application is incorporated herein by reference.

BACKGROUND OF THE INVENTION

1. Field of Invention

The present invention relates to an apparatus and a method for driving an interlaced plasma display panel (PDP). In particular, it relates to an apparatus and a method for driving an interlaced PDP capable of reducing flickers at the upper edge and the lower edge of an image.

2. Description of the Related Art

In general, the time for displaying images of an interlaced plasma display panel (PDP) can be divided into an even field and an odd field. The even field displays the image signal of even scan lines, and the odd field displays the image signal of odd scan lines. The even field and the odd field are displayed one after the other.

Referring to FIG. 1, it is a timing chart of even field signal in a conventional PDP. Wherein, Scan0, Scan2 and Scan4 are scan signals from a scan side driver, corresponding to the scan lines 0, 2 and 4, respectively. Scani indicates a scan signal of odd scan lines, and Scanj indicates a scan signal of even scan lines. Common indicates a common signal from a common side driver. Data indicates a data signal from a data side driver. The axis of time in FIG. 1 is divided into three periods by four vertical dotted lines, namely a reset period 101, an address period 102 and a sustain discharge period 103, respectively. As shown in FIG. 1, since the address period 102 is an even field, scan pulses appear in the scan signals of even scan lines only. Thus, the even scan lines light up, and the odd scan lines don't.

FIG. 2 is a timing chart of odd field signal in a conventional PDP. Since the address period 202 in FIG. 2 is an odd field, scan pulses appear in the scan signals of odd scan lines only. Thus, the odd scan lines light up, and the even scan lines don't.

In a conventional interlaced driving mode, the alternate display of odd scan lines and even scan lines would result in flickers at the upper edge and the lower edge of an image to affect the visual effect. Please refer to FIG. 3. Suppose the PDP has 720 scan lines, marked with numbers 0 to 719, then the first scan line 304 (number 0) only lights up in an even field, and the last scan line 303 (number 719) only lights up in an odd field. Consequently, the even field image 301 and odd field image 302 are alternatively displayed, so human eyes would detect flickers.

The U.S. Pat. No. 6,169,527 introduces a method, where black, opaque shades are added at the uppermost area and the lowermost area of a display region to prevent the flickers in the interlaced driving mode. But, when the upper edge and the lower edge of the image are not the upper edge and the lower edge of the panel, for example, when displaying the popular 16:9 images by 4:3 displays, the flickers remain.

Thus a better method is desired to prevent the above-described flickers when the upper edge and the lower edge of the image are not the upper edge and the lower edge of the panel.

SUMMARY OF THE INVENTION

An object of the present invention is to provide an apparatus for driving an interlaced plasma display panel (PDP) capable of preventing the flicker at the upper edge and the lower edge of an image.

Another object of the present invention is to provide a method for driving an interlaced plasma display panel (PDP) capable of preventing the flicker at the upper edge and the lower edge of an image, wherein the upper edge and the lower edge of the image are different from the upper edge and the lower edge of the panel.

To achieve the above-described and other objects, the present invention provides an apparatus for driving an interlaced PDP, the apparatus comprising a delay device, an image upper and lower edge detection device, an image border processing device and an image processing and analog control loop. The delay device receives an image signal, delays the received image signal for two fields and then outputs the delayed image signal. The image upper and lower edge detection device receives and analyses image signals, outputs the positions of the upper edge and the lower edge of image signals, saves and provides the data of the upper edge and the lower edge of an odd field of image signals. The image border processing device outputs image signals after border processing according to the delayed image signals, the positions of the upper edge and the lower edge of image signals and the data of the upper edge and the lower edge of an odd field. The image processing and analog controlling loop outputs a driving signal according to the image signals after border processing and the positions of the upper edge and the lower edge of image signals.

In the above-described apparatus for driving an interlaced PDP, in an embodiment, the positions of the upper edge and the lower edge of image signals comprise a scan line position of a upper edge, a field position of a upper edge, a scan line position of a lower edge and a field position of a lower edge.

In the above-described apparatus for driving an interlaced PDP, in an embodiment, the above-described image upper lower edge detection device further comprises a scan line decision device, a upper edge detection device, a lower edge detection device, a upper edge comparison device, a lower edge comparison device and an odd field upper edge and lower edge memory device. The scan line decision device receives image signals, judges whether there is an image signal for each scan line, and outputs a decision signal. The upper edge detection device outputs a temporary upper edge position according to the decision signal. The lower edge detection device outputs a temporary lower edge position according to the decision signal. The upper edge comparison device compares two temporary upper edge positions of image signals in odd field and in even field, outputs the lower temporary upper edge position as the scan line position of upper edge, and outputs the field position of upper edge. The lower edge comparison device compares two temporary lower edge positions of image signals in odd field and in even field, outputs the higher temporary lower edge position as the scan line position of lower edge, and outputs the field position of lower edge. The odd field upper and lower edge memory device receives the above-described image signals and the above-described upper edge and lower edge positions of an image, saves and provides upper edge and lower edge data in the odd field of image signals.

In the above-described apparatus for driving interlaced PDP, in an embodiment, the detail operations of the image border processing device are as follows. If a scan line number is smaller than the number representing scan line position of upper edge or larger than the number representing scan line position of lower edge, the image border processing device outputs a preset gray level value. If the scan line number is equal to either the number representing scan line position of upper edge or the number representing scan line position of lower edge, the scan line is located in an even field and the present frame is in the even field, then the device saves and outputs the image data of the scan line after dividing the data by two; if the scan line number is equal to either the number representing scan line position of upper edge or the number representing scan line position of lower edge, the scan line is located in an even field and the present frame is in the odd field, then the device outputs the previously saved image data of the scan line divided by two. If a scan line number is equal to either the number representing scan line position of upper edge or the number representing scan line position of lower edge, and the scan line is located in an odd field, then the device outputs the corresponding data of upper edge and lower edge in odd field. Finally, if a scan line number is larger than the number representing scan line position of upper edge and smaller than the number representing scan line position of lower edge, then the device directly outputs the image signal of the scan line without processing.

In one embodiment, the above-described apparatus for driving interlaced PDP further comprises a luminance adjusting device, which is coupled between the delay device and the image border processing device. The luminance adjusting device adjusts image signals according to the relationship between the gray scale of image signals and the brightness ratio perceived by human eyes.

In another perspective, the present invention also provides a method for driving an interlaced PDP. The method comprises the following steps. First, an image signal is analyzed, and the scan lines at upper edge and lower edge of the image is found. Then, the image data of the above-mentioned scan lines are divided by two and the divided image data are output twice in both the even field and odd field.

In an embodiment, the above-described method for driving an interlaced PDP further comprises the following steps. First, the above-described image signals are received. After the image signals are delayed for two fields, the delayed image signals are provided. Then, the image signals are analyzed and the positions of the upper edge and lower edge of an image of the above-described image signals are provided. Thereafter, the data of upper edge and lower edge in odd field are provided according to the positions of upper edge and lower edge of an image, and the image signals after border processing are provided according to the delayed image signals, the positions of upper edge and lower edge of an image and the data of upper edge and lower edge in an odd field. Finally, a driving signal is provided according to the image signals after border processing and the positions of upper edge and lower edge of an image.

The present invention mainly employs the above-described image upper and lower edge detection device to locate the positions of upper edge and lower edge of an image. Then, the image border processing device lights up the scan lines of the upper edge and lower edge of an image both in even field and in odd field. Therefore, even when the upper edge and the lower edge of an image are not the upper edge and the lower edge of a panel, the flickers caused by interlaced scanning can also be prevented.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

Figure 1:
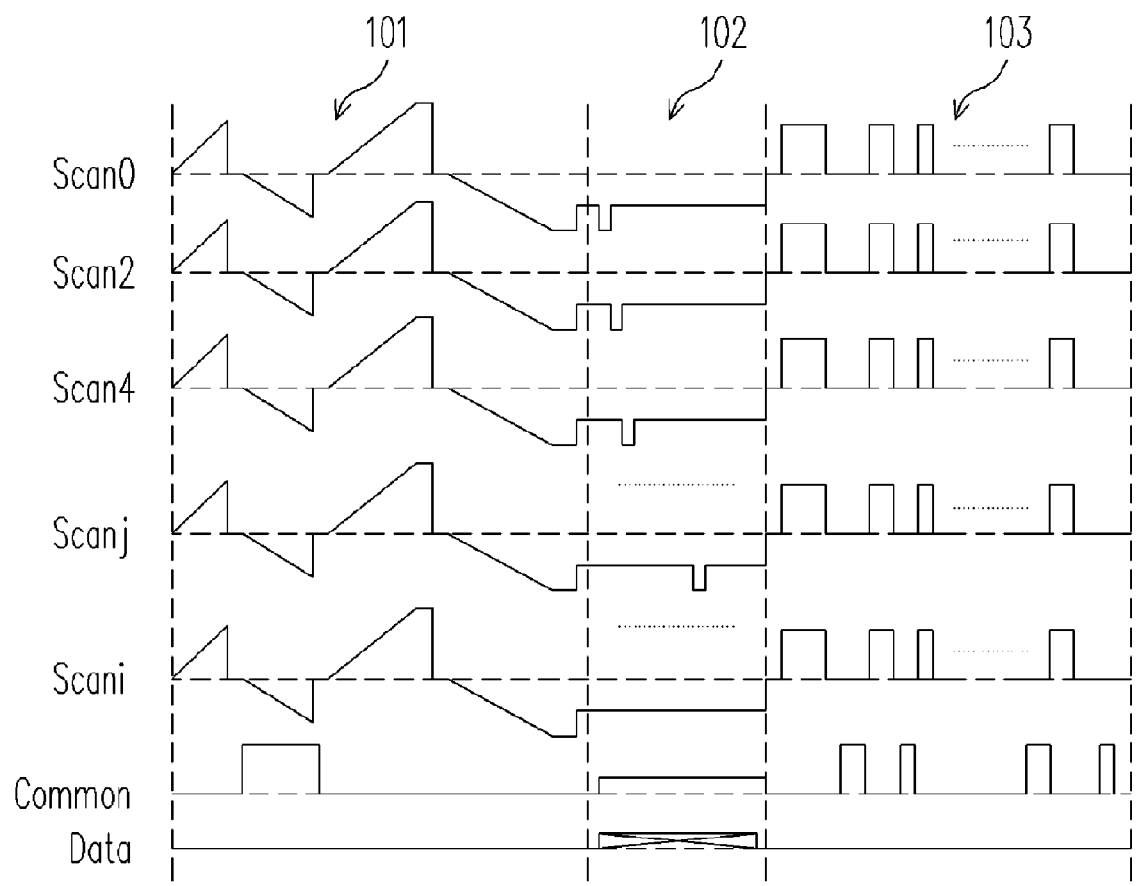
FIG. 1 is a signal timing chart of an even field signal in a conventional PDP.
Figure 2:
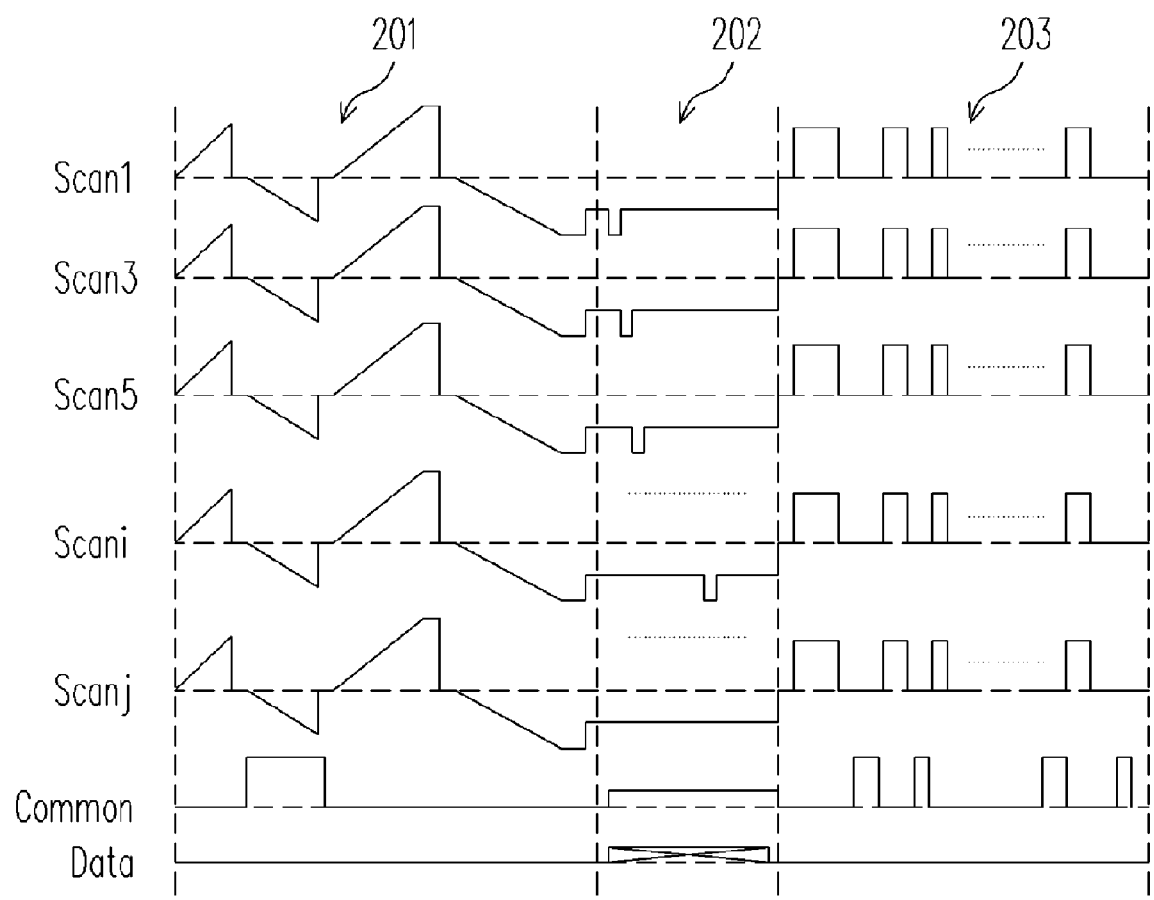
FIG. 2 is a signal timing chart of an odd field signal in a conventional PDP.
Figure 3:
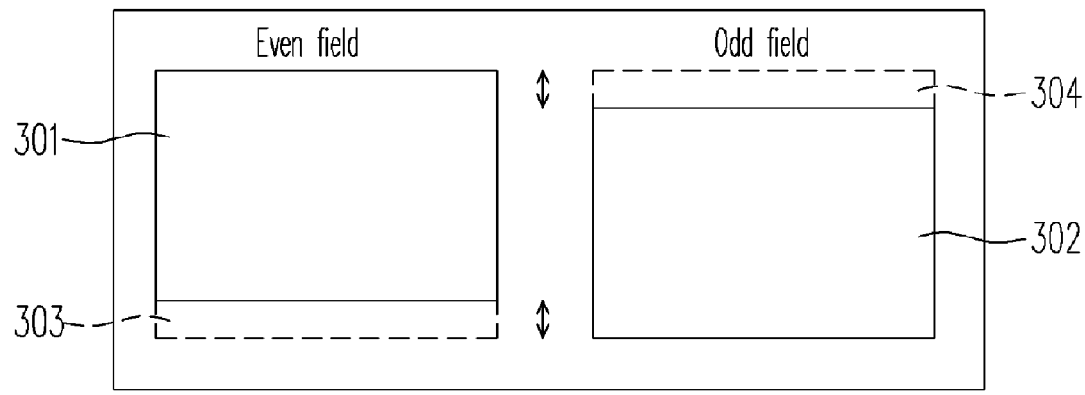
FIG. 3 is a schematic diagram showing a flicker phenomenon at the upper edge and the lower edge of an image in a conventional PDP.
Figure 4:
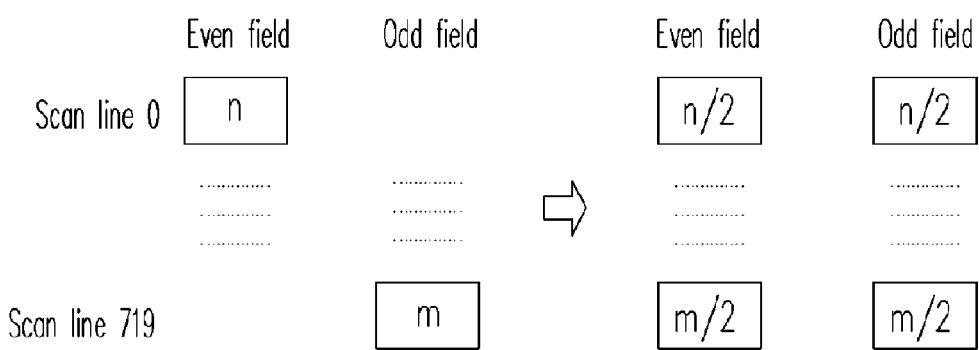
FIG. 4 is a schematic diagram showing a difference between an embodiment of the present invention and the conventional technology.

Referring to FIG. 4, a schematic diagram of an embodiment of the present invention. It is assumed that the PDP of the embodiment has 720 scan lines, from scan line number 0 to 719. The upper edge of the image is scan line number 0. Assume the image signal of scan line 0 is n. The lower edge of the image is scan line number 719. Assume the image signal of scan line 719 is m. The left side of FIG. 4 is the conventional technology, where scan line 0 at the upper edge is displayed only in the even field and scan line 719 at the lower edge is displayed only in the odd field. On the other hand, the right side of FIG. 4 is the present embodiment. In the embodiment, the image data of scan lines of upper edge and lower edge of the image are divided by two, and the divided image data are output twice in the even field and in odd field. As shown on the ride side of FIG. 4, the image data of scan line 0 divided by 2, namely n/2, is displayed both in the even field and in the odd field. Similarly, the image data of scan line 719 divided by 2, namely m/2, is also displayed both in the even field and in the odd field. Thus, the scan lines of upper edge and lower edge of the image can be seen in both even field and odd field. Consequently, the flickering at the upper edge and lower edge can be prevented. Because the image data of the upper edge and the lower edge are already divided by 2, although the image data are displayed twice, the overall brightness remains unchanged.

Figure 5:
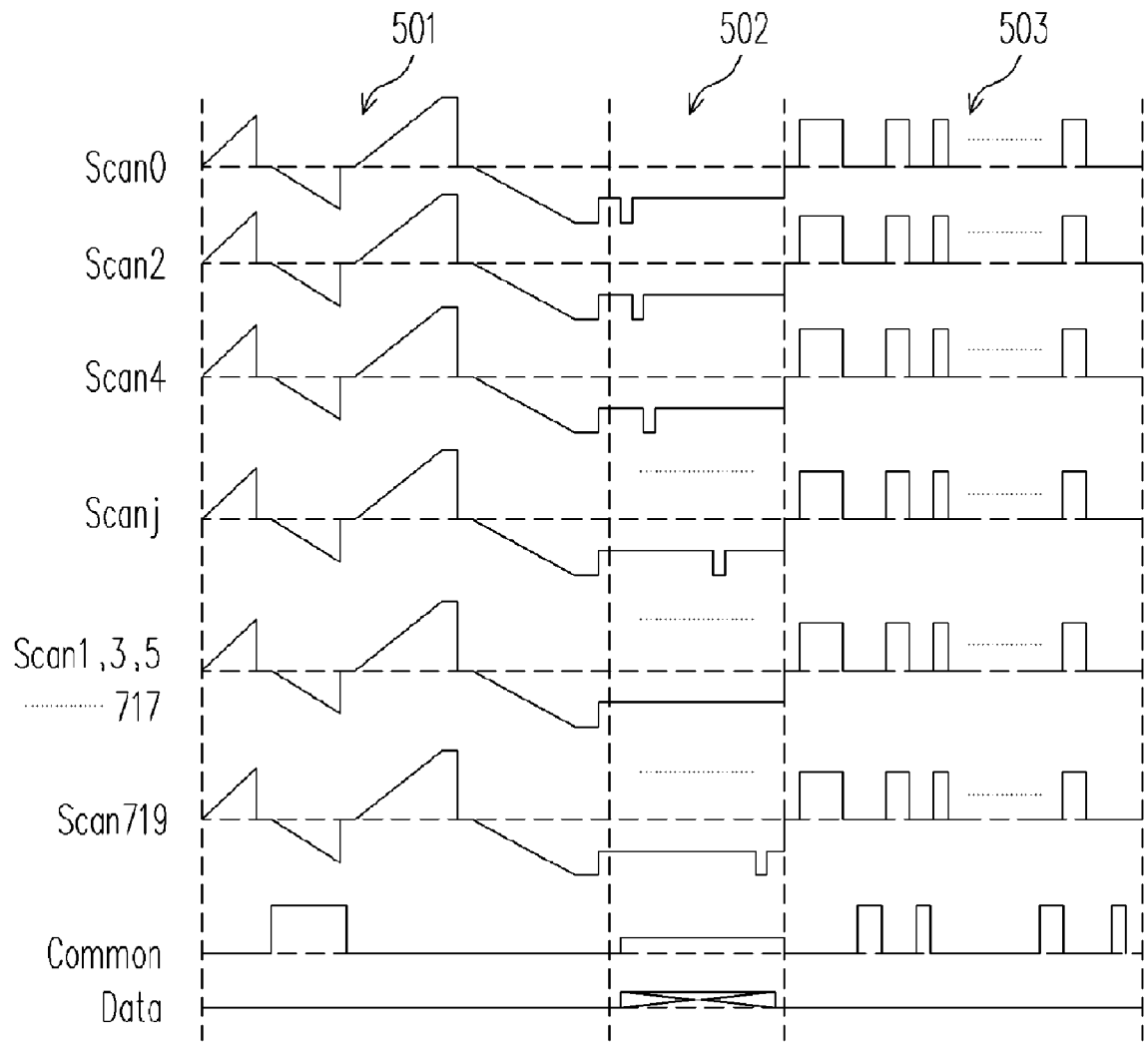
FIG. 5 is a signal timing chart of an even field signal in an embodiment of the present invention.
Figure 6:
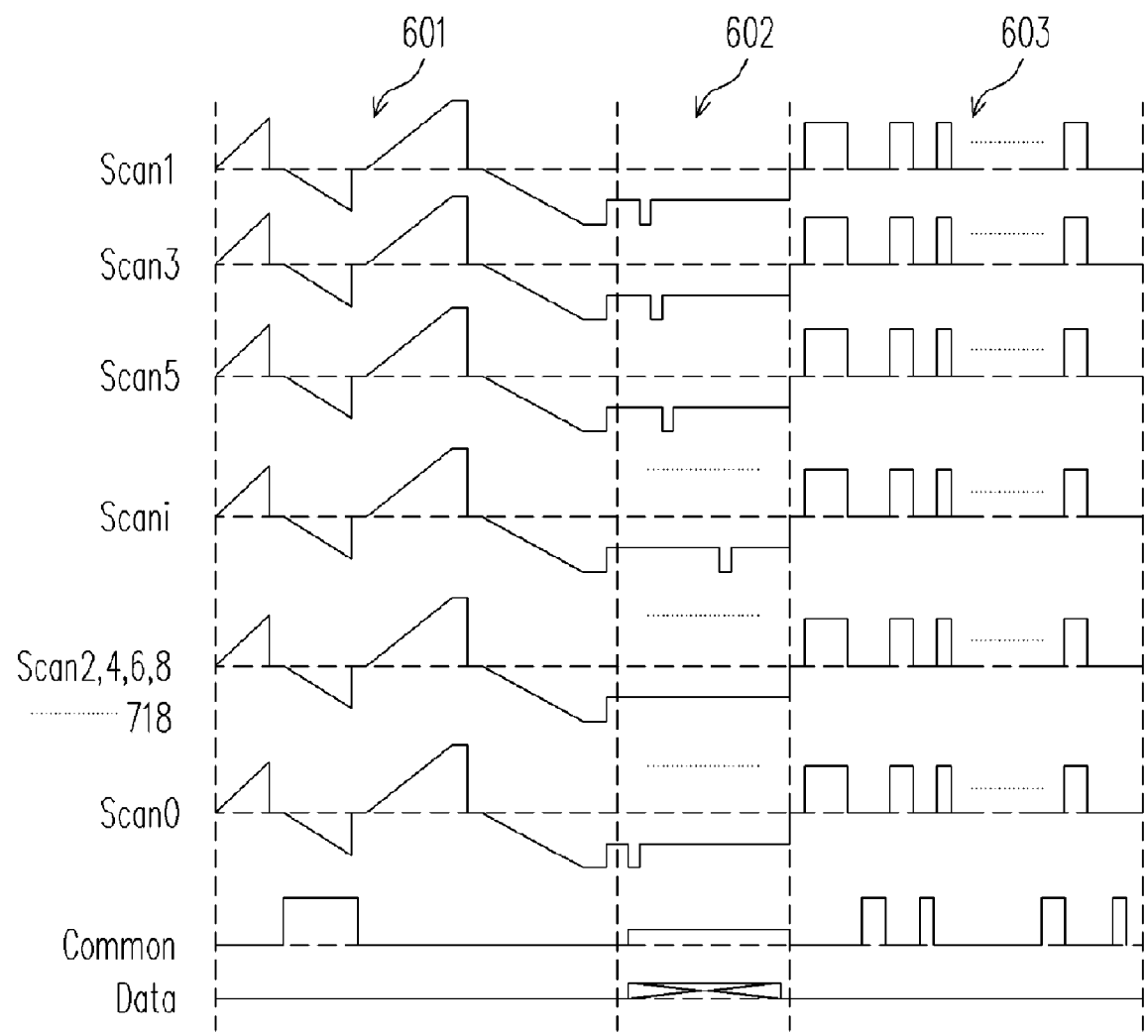
FIG. 6 is a signal timing chart of an odd field signal in an embodiment of the present invention.

FIG. 5 is a signal timing chart of even field signal in an embodiment of the present invention, wherein 501, 502 and 503 are the reset period, the addressing period and the sustain period, respectively. Scan0 to Scan 719 are scanning signals on scan line 0 to scan line 719. "Common" is the common signal from the common side driver. "Data" is the data signal from the data side driver. As shown in FIG. 5, in an even field, all even scan lines light up, and only one odd scan line, scan line 719, lights up and the other odd scan lines do not. On the other hand, FIG. 6 is a signal timing chart of odd field signal in an embodiment of the present invention, wherein 601, 602 and 603 are the reset period, the addressing period and the sustain period, respectively. The other tags have the same meaning as that of their counterparts in FIG. 5. FIG. 6 is contrary to FIG. 5 in that, in the odd field, all odd scan lines light up, and only one even scan line, scan line 0, lights up and the other even scan lines do not. In any case, the scan line 0 and the scan line 719 light up in both the even field and odd field, and the other scan lines remain unchanged.

Figure 7:
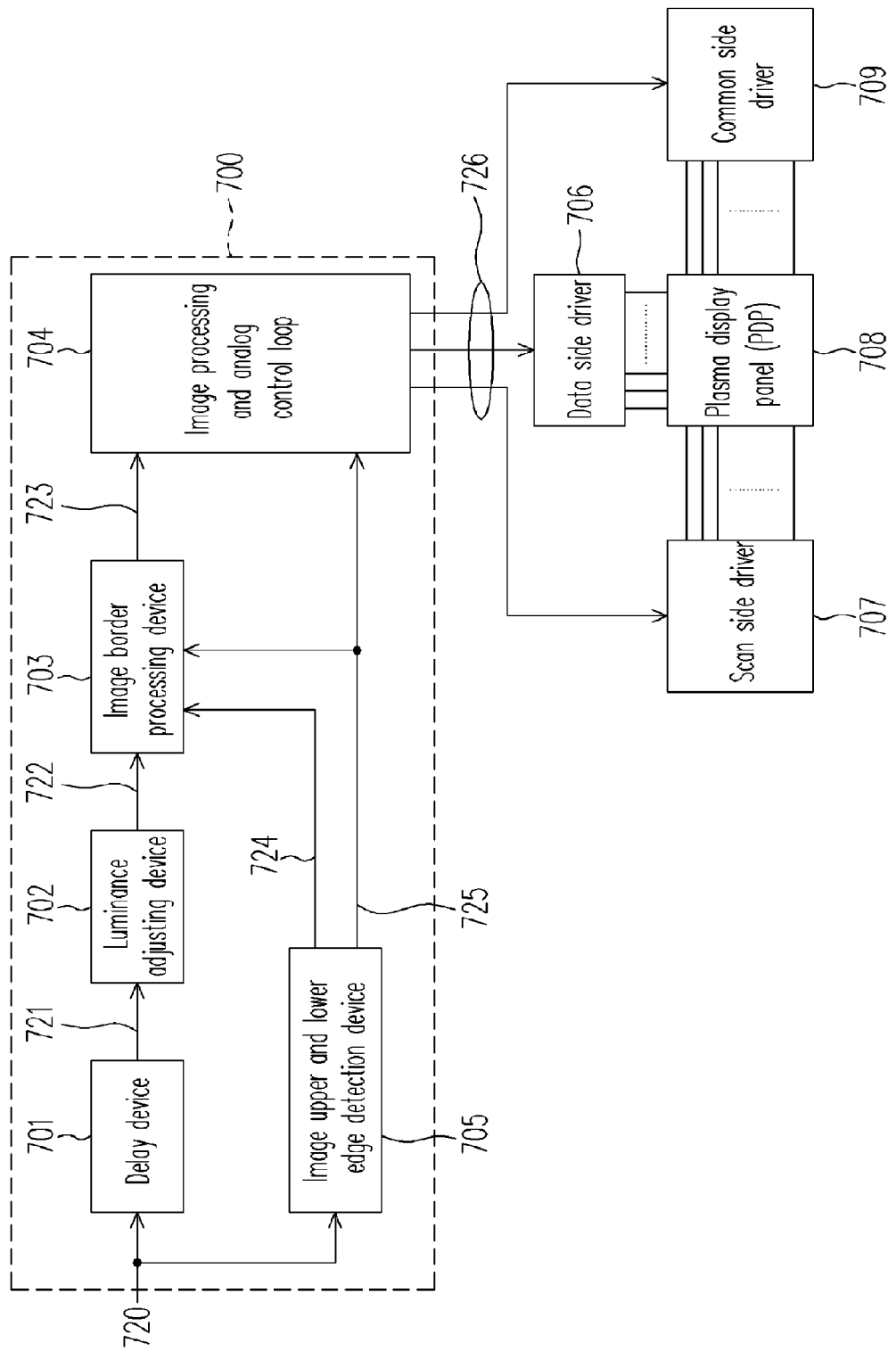
FIG. 7 is a block diagram showing an apparatus for driving an interlaced PDP in an embodiment of the present invention.

If the upper edge and the lower edge of an image are not the upper edge and the lower edge of a panel, the circuit of FIG. 7 is needed to locate the scan lines at the upper edge and the lower edge of the image for the above-described processing. As for the portion beyond the upper edge and the lower edge of the image, scan pulses are not output for saving signal waveform time.

FIG. 7 is a block diagram showing an apparatus 700 for driving an interlaced PDP according to the present invention. The apparatus for driving an interlaced PDP 700 comprises a delay device 701, a luminance adjusting device 702, an image upper and lower edge detection device 705, an image border processing device 703 and an image processing and analog control loop 704.

The delay device 701 receives the image signal 720, delays the received image signal 720 for two fields and then outputs the delayed image signal 721. To locate the upper edge and lower edge of an image, the image upper and lower edge detection device 705 need to detect the image signals of two fields, thus the delay device 701 is required to synchronize the image signals provided to the image border processing device 703 and the output from the image upper and lower edge detection device 705. Another function of the delay device 701 in the embodiment is to fill the odd scan lines in the even field and the even scan lines in the odd field of image signals 720 with the image data with zero value. Due to interlaced scanning, the original image signals 720 only have the image data of even scan lines in the even field, and only the image data of odd scan lines in the odd field. After filling, the image signals 720 would have data of all scan lines in both the even field and odd field. However, for the non-existing scan lines, the image data are zero.

The luminance-adjusting device 702 is coupled between the delay device 701 and the image border processing device 703, for adjusting the output of the delay device 701 according to the relationship between the gray scale of image signals 720 and the brightness ratio perceived by human eyes, so that correct brightness ratios expressed by the original image data can be perceived by human eyes. In some embodiments of the present invention, the luminance adjustment function of the luminance adjusting device 702 is merged into the image processing and analog control loop 704 for processing.

The image upper and lower edge detection device 705 analyzes image signals 720 and outputs upper edge and lower edge positions 725 of image signals 720. In addition, the device 705 also saves and provides the data of upper edge and lower edge in the odd field 724, as described in detail hereinafter.

The image border processing device 703 outputs image signals 723 after border processing according to the image signal 722 after delay and luminance adjustment, positions 725 of upper edge and lower edge of the image, and data of upper edge and lower edge in the odd field 724. Border processing refers to dividing the image data of scan lines of upper edge and lower edge of image by two, and outputting the divided image data twice in the even field and in the odd field. The border processing will be described in detail hereinafter.

The image processing and analog control loop 704 outputs the driving signals 726 to the scan side driver 707, the data side driver 706 and the common side driver 709 according to the image signals 723 after border processing and the positions 725 of upper edge and lower edge of the image. These three drivers would generate various signals in FIG. 5 and FIG. 6 to drive the PDP 708 according to the driving signals 726.

Figure 8:
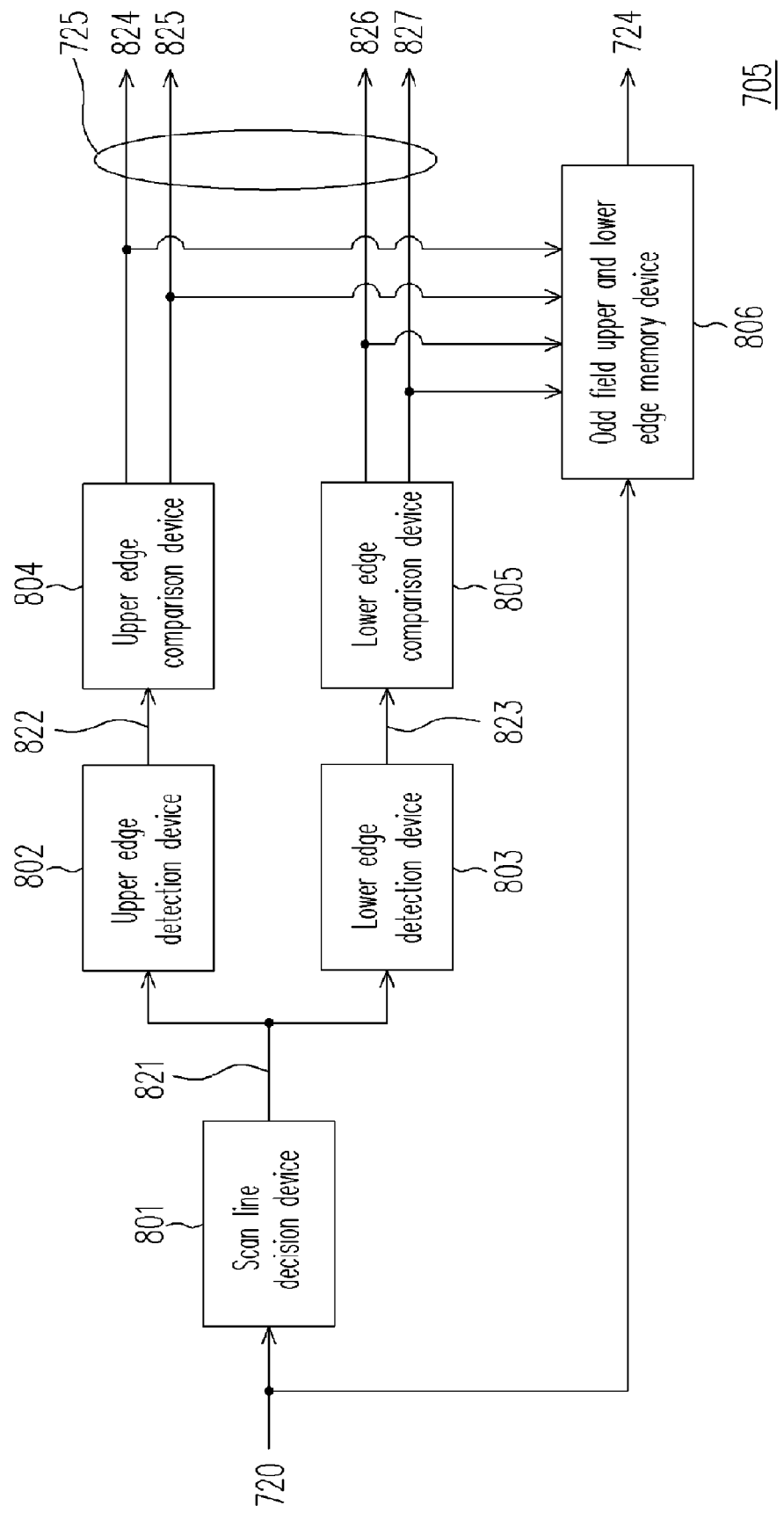
FIG. 8 is a block diagram showing an image upper and lower edge detection device in an apparatus for driving an interlaced PDP according to an embodiment of the present invention

FIG. 8 is a structure block diagram showing an image upper and lower edge detection device 705 in an embodiment of the present invention. The device image upper and the lower edge detection device 705 in the embodiment comprises a scan line decision device 801, an upper edge detection device 802, a lower edge detection device 803, an upper edge comparison device 804, a lower edge comparison device 805 and a odd field upper and lower edge memory device 806.

The scan line decision device 801 receives the image signals 720, then outputs a decision signal 821 based on whether a scan line has an image signal. In the embodiment, the decision signal 821 is a 1-bit binary number to indicate whether a corresponding scan line has image signals. 0 means no image signals and 1 means there are image signals. Nevertheless, the present invention is not limited to the above-mentioned method. How the scan line decision device 801 judges whether a scan line has image signals is described in detail hereinafter.

The upper edge detection device 802 outputs a temporary upper edge position 822 of the image signals 720 according to the decision signal 821. In the embodiment, the temporary upper edge position 822 is the number of the uppermost scan line with image signals. Since the PDP 708 has 720 scan lines, there are 360 scan lines in the even field and the odd field, respectively. Therefore, the temporary upper edge position 822 is represented by a 9-bit binary number. Nevertheless, the present invention is not limited to the above-mentioned panel resolution, neither to such expressing method. In the same way, the lower edge detection device 803 would output a temporary lower edge position 823 of the image signals 720 according to the decision signal 821. In the embodiment, the temporary lower edge position 823 is the number of the lowermost scan line with image signals and is represented by a 9-bit binary number. Nevertheless, the present invention is not limited to the above-mentioned method. In the same way, the lower edge detection device 803 would output a temporary lower edge position 823 of the image signals 720 according to the decision signal 821. In the embodiment, the temporary lower edge position 823 is the number of the lowermost scan line with image signals and is represented by a 9-bit binary number.

The upper edge comparison device 804 compares two temporary upper edge positions 822 of the image signals 720 in the odd field and even field, outputs the lower temporary upper edge position as the scan line upper edge position 824, and outputs the upper edge field position 825. The scan line upper edge position 824 is the actual upper edge position in both fields, and is represented by a 9-bit binary number. Whereas, the upper edge field position 825 in the embodiment is an 1-bit binary number to indicate in which field the real upper edge of the image is located. Wherein, 0 means it is located in even field, namely, the temporary upper edge position 822 in the even field takes a lower position. 1 means it is located in the odd field, namely, the temporary upper edge position 822 in the odd field takes a lower position. Nevertheless, the present invention is not limited to the above-mentioned method. In the same way, the lower edge comparison device 805 would compare the temporary lower edge positions 823 of the image signals 720 in both the odd field and even field, and outputs the higher position as the scan line lower edge position 826 (represented by a 9-bit binary number) and also outputs the lower edge field position 827 (represented by a 1-bit binary number).

In the embodiment, the upper edge and lower edge positions 725 in fact comprise four signals, namely, a scan line upper edge position 824, an upper edge field position 825, a scan line lower edge position 826 and a lower edge field position 827.

The odd field upper and lower edge memory device 806 receives the image signals 720 and the upper and lower edge positions 725, to determine whether the upper edge and the lower edge of the image are located in the odd field. If at least one of upper edge and lower edge is located in the odd field, the image data of the corresponding scan line are divided by two, saved and then output. The above-mentioned image data are the odd field upper edge and lower edge data 724. The reason for such procedure is explained as follows. During border processing of the image signals 720, if the upper edge and lower edge of the image are located in odd scan lines, namely, in odd field, then before outputting the above-mentioned image data in the even field, the image data of scan lines of upper edge and lower edge of the image should be output. Therefore, the data of upper edge and lower edge in the odd field 724 must be saved for spare purpose, as described in detail hereinafter.

Referring to FIG. 8, how the scan line decision device 801 judges whether a scan line has image signals or not is described. In the scope of the present invention, any reasonable, clear decision method can be used. For example, in the first decision method, if an image data of any color signal (red signal, green signal or blue signal) of a scan line is larger than a preset value, then the scan line is determined as a scan line with image signal. Otherwise, the scan line is determined as a scan line without image signal.

In the second decision method, for example, if any of sum(R), sum(G) and sum(B) of a scan line is larger than a preset value, then the scan line is determined as a scan line with image signal. Otherwise, the scan line is determined as a scan line without image signal. Wherein, sum(R), sum(G) and sum(B) represent the image data sum of the red signal, green signal or blue signal of a scan line, respectively.

In the third decision method, for example, if the sum of sum(R), sum(G) and sum(B) of a scan line is larger than a preset value, then the scan line is determined as a scan line with image signal. Otherwise, the scan line is determined as a scan line without image signal.

In the fourth decision method, for example, if a scan line meets the condition: A1*sum(R)+A2*sum(G)+A3*sum(B) >T, then the scan line is determined as a scan line with image signal. Otherwise, the scan line is determined as a scan line without image signal. Wherein, A1, A2 and A3 are preset weight, T is the above-mentioned preset value. As a matter of fact, the third decision method is an exception of the fourth decision method. When A1=A2=A3=1, the fourth decision method is the third decision met.

The border processing in the embodiment is explained in detail as follows. The image border processing device 703 in FIG. 7 would compare the number of each scan line with the scan line upper edge position 824 and the scan line lower edge position 826 of the upper edge and lower edge positions 725, and process the data in different ways according to different situations.

If the current scan line number is smaller than the scan line upper edge position 824, or larger than the scan line lower edge position 826, that is, the scan line is outside the upper edge and the lower edge of the image, then the image border processing device 703 outputs a preset gray level. In the embodiment, the preset value of gray level is 0 to increase the contrast. In other embodiments of the present invention, the preset value of gray level is 20 to decrease the burn-in effect. Nevertheless, the preset values of gray level in the present invention are not limited to the above-mentioned values.

If the current scan line number is equal to the scan line upper edge position 824, or equal to the scan line lower edge position 826 (that is, the scan line is located at one of the upper edge and the lower edge of the image), and the scan line is in the even field (that is, the number of the scan line is even number), then the data are processed in the following two situations. If the current frame is in an even field, the image border processing device 703 would divide the current image data by two and then save and output it. If the current frame is in an odd field, the image border processing device 703 would output the previously saved and divided image data of scan line in the even field.

If the current scan line number is equal to the scan line upper edge position 824, or equal to the scan line lower edge position 826 (that is, the current scan line is located at one of the upper edge and the lower edge of the image), and the current scan line is in the odd field (that is, the number of the scan line is an odd number), then the image border processing device 703 would output the corresponding odd field upper edge and lower edge data 724. The so-called "corresponding" means, if the current scan line is at the upper edge of an image, the upper edge data in the odd field upper edge and lower edge data 724 would be output. And, if the current scan line is at the lower edge of an image, the lower edge data would be output. Because the image signals received by the image border processing device 703 are previously processed by the delay device 701 and the image signals received by the upper and lower edge detection device 705 are without delay, therefore the image upper and lower edge detection device 705 can provide the corresponding odd field upper and lower edge data 724.

Finally, if the current scan line number is larger than the scan line upper edge position 824 and smaller than the scan line lower edge position 826 (that is, the current scan line is between the upper edge and the lower edge of an image), then the image border processing device 703 would directly output the current image signals without processing.

Figure 9:
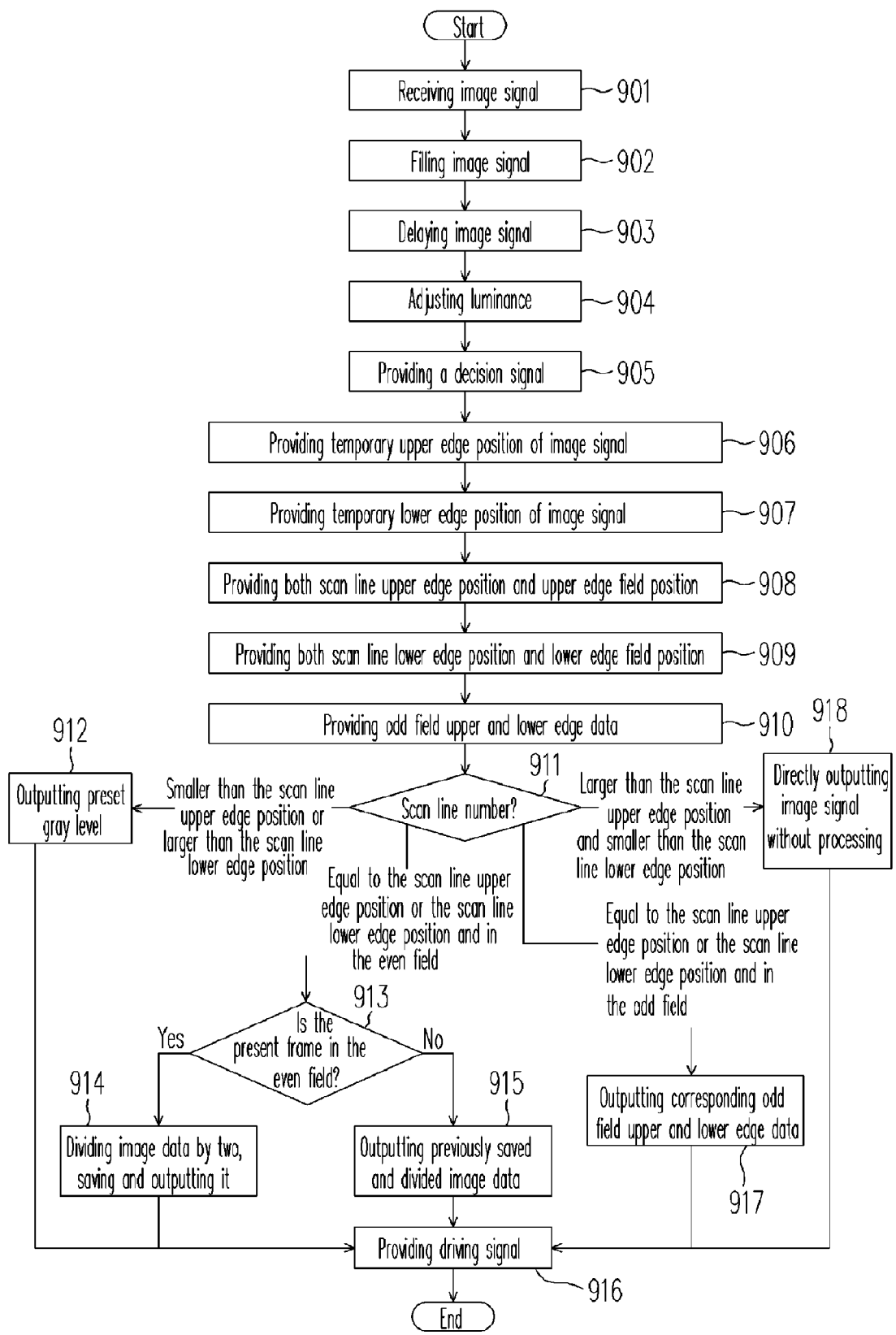
FIG. 9 is a flow chart of a method for driving an interlaced PDP according to an embodiment of the present invention.

In addition to the apparatus for driving an interlaced PDP, the present invention comprises a method for driving an interlaced PDP as well. FIG. 9 is a flow chart of a method for driving an interlaced PDP according to another embodiment of the present invention. The operations in FIG. 9 correspond to those of the PDP 700 in FIG. 7. The operations in FIG. 9 begin with step 901.

In the step 901, the delay device 701 receives image signals 720. Then at step 902, the odd scan lines in the even field and the even scan lines in the odd field are filled with the image data of 0 value. Further at step 903, the delay device 701 delays the image signals 720 for two fields, then provides the delayed image signals 721. Next, at step 904, the luminance adjusting device 702 adjusts the difference of image signals between the gray scale ratio of image signals 721 and the brightness ratio perceived by human eyes.

Then, in step 905, the scan line decision device 801 receives image signals 720, and provides a decision signal 821 according to whether each scan line has image signals. Then at step 906, the upper edge detection device 802 provides a temporary upper edge position 822 according to the decision signal 821. At step 907, the lower edge detection device 803 provides a temporary lower edge position 823 according to the decision signal 821.

Thereafter at step 908, the upper edge comparison device 804 compares two temporary upper edge positions 822 respectively in the odd field and in even field, takes the lower one as the scan line upper edge position 824 and provides the upper edge field position 825. Then at step 909, the lower edge comparison device 805 compares two temporary lower edge positions 823 respectively in the odd field and in even field, takes the higher one as the scan line lower edge position 826 and provides the lower edge field position 827.

Thereafter at step 910, the odd field upper and lower edge memory device 806 provides the odd field upper and lower edge memory device 724 according to the upper edge and lower edge positions 725.

Thereafter in regard to border processing, at step 911, the image border processing device 703 checks the current scan line number, then the process goes to step 912, 913, 917 or 918 according to different situations.

If the current scan line number is smaller than the scan line upper edge position 824 or larger than the scan line lower edge position 826, the image border processing device 703 would at step 912 output a preset gray level value, before entering step 916.

If the current scan line number is equal to the scan line upper edge position 824 or the scan line lower edge position 826, and in the even field, the process goes to step 913 where it is determined whether the current frame is an even field. If yes, the image border processing device 703 would at step 914 divide the current image data of the scan line by two and then save and output it. Otherwise, the image border processing device 703 would at step 915 output the previously saved and divided image data of scan line at step 914. Regardless of what the decision result is in step 913, the process then goes to step 916.

If the current scan line number is equal to the scan line upper edge position 824 or the scan line lower edge position 826 and in the odd field, then the image border processing device 703 would at step 917 output the corresponding odd field upper edge and lower edge data 724, before entering step 916.

If the current scan line number is larger than the scan line upper edge position 824 and smaller than the scan line lower edge position 826, the image border processing device 703 would at step 918 directly output the current image signals of the scan line without processing, before entering step 916.

Finally, the image processing and analog control loop 704 would at step 916 provide the driving signal 726 according to the image signal 723 after border processing and the image upper edge and lower edge positions 725.

From the above-described embodiments, it is known that the principle of the invention is to analyze image signals and locate the scan lines at upper edge and lower edge of an image. Then, the image data of the above-described scan lines are divided by two and output twice in even field and in odd field so that the scan lines of the upper edge and lower edge of the image light up in both the even field and odd field. Consequently, when the upper edge and lower edge of the image are different from the upper edge and lower edge of the panel, the flickering caused by interlaced scanning mode can still be prevented.

It will be apparent to those skilled in the art that various modifications and variations can be made to the structure of the present invention without departing from the scope or spirit of the invention. In view of the foregoing, it is intended that the specification and examples to be considered as exemplary only, with a true scope and spirit of the invention being indicated by the following claims and their equivalents.

What is claimed is:

1. An apparatus for driving an interlaced plasma display panel (PDP), comprising:

a delay device for receiving an image signal, delaying said image signal for a plurality of fields and outputting said delayed image signal;

an image upper and lower edge detection device for receiving and analyzing said image signal, outputting an upper and lower edge position of said image signal, saving and providing an odd field upper and lower edge data of said image signal, wherein said image upper and lower edge detection device further comprises:

a scan line decision device for receiving said image signal, and outputting a decision signal based on image signal of scan lines in said image signal;

an upper edge detection device for outputting a temporary upper edge position of said image signal according to said decision signal;

a lower edge detection device for outputting a temporary lower edge position of said image signal according to said decision signal;

an upper edge comparison device for comparing said temporary upper edge positions of said image signal in the odd field and even field, taking the lower one as said scan line upper edge position for output and outputting said upper edge field position;

a lower edge comparison device for comparing said temporary lower edge positions of said image signal in the odd field and even field, taking the higher one as said scan line lower edge position for output and outputting said lower edge field position; and an odd field upper and lower edge memory device for receiving said image signal and the upper and lower edge positions of said image, saving and providing said odd field upper and lower edge data of said image signal; and an image border processing device for outputting said image signal after border processing according to said delayed image signal, said upper and lower edge positions and said odd field upper and lower edge data; and an image processing and analog control loop for outputting a driving signal according to said image signal after boundary processing and said upper and lower edge positions.

2. The apparatus for driving an interlaced PDP as recited in claim 1, wherein said delay device is further used for filling the odd scan lines in the even field and the even scan lines in the odd field of said image signal with an image data of zero value.

3. The apparatus for driving an interlaced PDP as recited in claim 1, wherein said image upper and lower edge positions comprise a scan line upper edge position, an upper edge field position, a scan line lower edge position and a lower edge field position of said image signal.

4. The apparatus for driving an interlaced PDP as recited in claim 3, wherein the border processing of said image border processing device comprises:

outputting a preset value of gray level if the number of one of said scan lines is smaller than said scan line upper edge position;

outputting a preset value of gray level if the number of one of said scan lines is larger than said scan line lower edge position;

dividing the image data of one of said scan lines by two, then saving and outputting said divided data if the number of said scan line is equal to one of said scan line upper edge position and said scan line lower edge position, and if said scan line is in the even field and if the current frame is in the even field; outputting the previously saved and divided image data of said scan line if said scan line number is equal to said scan line upper edge position or said scan line lower edge position and if said scan line is in the even field and if the current frame is in the odd field;

outputting the corresponding odd field upper and lower edge data if the number of one of said scan lines is equal to said scan line upper edge position or said scan line lower edge position and if said scan line is in an odd field; and directly outputting the image signal of one of said scan lines if the number of said scan line is larger than said scan line upper edge position and smaller than said scan line lower edge position.

5. The apparatus for driving an interlaced PDP as recited in claim 1, wherein said temporary upper edge position is the position of the scan line with image signal and closest to the upper edge in the current field, while said temporary lower edge position is the position of the scan line with image signal and closest to the lower edge in the current field.

6. The apparatus for driving an interlaced PDP as recited in claim 1, wherein said scan line decision device determines one of said scan lines has an image signal when any image data of any color signal of said scan line is larger than a preset value.

7. The apparatus for driving an interlaced PDP as recited in claim 1, wherein said scan line decision device determines a scan line has an image signal when an image data sum of a color signal of said scan line is larger than a preset value.

8. The apparatus for driving an interlaced PDP as recited in claim 1, wherein said scan line decision device determines one of said scan lines has an image signal when said scan line meets the condition: A1*sum(R)+A2*sum(G)+A3*sum(B)>T, wherein A1, A2 and A3 are preset weight, sum(R), sum(G) and sum(B) represent the image data sum of the red signal, green signal and blue signal of said scan line, respectively, and T is a preset value.

9. The apparatus for driving an interlaced PDP as recited in claim 1, further comprising:
a luminance adjusting device, coupled between said delay device and said image border processing device.

10. A method for driving an interlaced plasma display panel (PDP), comprising:
analyzing an image signal to locate the scan lines at upper edge and lower edge of the image;
dividing the image data of said scan lines by two and outputting said divided image data twice in both the even field and odd field;
receiving said image signal, delaying said image signal for a plurality of fields, and then providing said delayed image signal;
analyzing said image signal and providing an upper and lower edge positions of said image signal, wherein the step of providing the upper and lower edge positions of said image signal comprises:
receiving said image signal, and providing a decision signal according to image signals of each scan line;
providing a position of temporary upper edge of said image signal according to said judgment signal;
providing a temporary lower edge position of said image signal according to said decision signal;
comparing said two temporary upper edge positions of said image signal in both the odd field and the even field, taking the lower one as said scan line upper edge position and providing said upper edge field position; and
comparing said two temporary lower edge positions of said image signal in both the odd field and the even field, taking the higher one as said scan line lower edge position and providing said lower edge field position; and
providing the odd field upper and lower edge data of said image signal according to said image upper and lower edge positions.

11. The method for driving an interlaced PDP as recited in claim 10, further comprising:
providing said image signal after border processing according to said delayed image signal, said image upper and lower edge positions and said odd field upper and lower edge data; and
providing a driving signal according to said image signal after border processing and said image upper and lower edge positions.

12. The method for driving an interlaced PDP as recited in claim 11, wherein said image upper and lower edge positions comprise a scan line upper edge position, an upper edge field position, a scan line lower edge position and a lower edge field position.

13. The method for driving an interlaced PDP as recited in claim 10, wherein said temporary upper edge position is the position of the scan line with image signal and closest to the upper edge in the current field, while said temporary lower edge position is the position of the scan line with image signal and closest to the lower edge in the current field.

14. The method for driving an interlaced PDP as recited in claim 13, wherein the step of providing said decision signal is to determine one of said scan lines has image signal when an image data of a color signal of said scan line is larger than a preset value.

15. The method for driving an interlaced PDP as recited in claim 13, wherein the step of providing said decision signal is to determine one of said scan lines has image signal when an image data sum of a color signal of said scan line is larger than a preset value.

16. The method for driving an interlaced PDP as recited in claim 13, wherein the step of providing said decision signal is to determine one of said scan lines has image signal when said scan line meets the condition: A1*sum(R)+A2*sum(G)+A3*sum(B)>T, wherein A1, A2 and A3 are preset weight, sum(R), sum(G) and sum(B) represent the image data sum of the red signal, green signal and blue signal of said scan line, respectively, and T is a preset value.

17. The method for driving an interlaced PDP as recited in claim 10, wherein the step of providing said image signal after border processing further comprises:
outputting a preset value of gray level if the number of a scan line is smaller than said scan line upper edge position or larger than said scan line lower edge position;
dividing the image data of said scan line by two, then saving and outputting said divided data if the number of said scan line is equal to one of said scan line upper edge position and said scan line lower edge position, and if said scan line is in an even field and if the current frame is in the even field; and outputting the previously saved and already divided image data of said scan line if the scan line number is equal to said scan line upper edge position or said scan line lower edge position and if said scan line is in an even field and if the current frame is in the odd field;

outputting the corresponding odd field upper and lower edge data if the number of said scan line is equal to one of said scan line upper edge position and said scan line lower edge position and if said scan line is in an odd field; and directly outputting the image signal of said scan line if the number of said scan line is larger than said scan line upper edge position and smaller than said scan line lower edge position.

18. The method for driving an interlaced PDP as recited in claim 10, between delaying said image signal and analyzing said image signal, the method comprising:

adjusting said image signal according to the relationship between the gray level of said image signal and the brightness ratio perceived by human eyes.

* * * * *